UNITED STATES PATENT OFFICE.

JOSEPH TOWNSEND, OF GLASGOW, COUNTY OF LANARK, SCOTLAND.

PROCESS OF OBTAINING SODA.

SPECIFICATION forming part of Letters Patent No. 298,256, dated May 6, 1884.

Application filed September 5, 1883. (No specimens.) Patented in England April 30, 1879, No. 1,703, and in Germany October 18, 1879, No. 10,641.

*To all whom it may concern:*

Be it known that I, JOSEPH TOWNSEND, a subject of the Queen of Great Britain and Ireland, and residing at Glasgow, in the county of Lanark, Scotland, have invented an improved combination of processes for obtaining soda and potash and their salts, also sulphur, sulphuric acid, chlorine, and hydrochloric acid from kainit or any substance or compound of similar compositions, (for which I have obtained British Letters Patent, dated April 30, 1879, No. 1,703, and still in force,) of which the following is a specification.

My invention has for its object to treat, in a useful and profitable manner, natural substances or compounds, such as that known as "kainit," and the composition of which is about the following, namely: sulphate of potash, twenty-six parts; sulphate of magnesia, twenty-one parts; chloride of sodium, twenty and one-half parts; chloride of magnesium, fourteen and one-half parts; insoluble matter, two and one-fourth parts; water, fifteen and three-fourth parts. Total, one hundred parts.

With every one hundred parts of this compound about forty pounds of silica or of a compound or mixture of silica and alumina are intimately mixed in a wet state, and the mixture is dried so as to be in a porous condition. Less than forty pounds of the silica is chemically sufficient, but that quantity is by preference used in order to keep the mass porous. The mixture is heated by preference in a muffle-furnace to a temperature of 1,000° to 1,500° Fahrenheit, or upward, care being, however, taken to avoid loss of the porous condition by too much fusion. A quantity of hydrochloric acid is given off, and may be collected and utilized in any known way. The heated porous mass is next, by preference, transferred to vertical retorts or other suitable apparatus and heated atmospheric air is passed through or in contact with it, and causes the evolution of chlorine; or if steam is passed through instead of air hydrochloric acid will be given off. The residue will consist, principally, of sulphate of soda, sulphate of potash, and silicate or silicate and aluminate of magnesia. This process is applicable to any similar compounds, however obtained, and when the kainit or similar compound varies in composition from that hereinbefore given the treatment will remain substantially the same, but the resulting products will of course correspond to the original composition in each case.

In order to advantageously complete the working up and utilization of the material, the residue consisting, as already mentioned, of sulphate of soda, sulphate of potash, and silicate or silicate and aluminate of magnesia, has a sufficiency of carbon or carbonaceous matter mixed with it, and the mixture is heated, so as to reduce the sulphates of soda and potash present into sulphides, care being, however, taken to keep the heat below what will volatilize the sulphides formed. The sulphides are separated by lixiviation, and the solution obtained being made strong, carbonic-acid gas obtained in any convenient way is passed through it. By this process the sulphides are converted into carbonates of soda and potash and the sulphur escapes as sulphureted hydrogen.

The mixed carbonates may be separated by well-known processes. I, however, prefer to continue passing carbonic-acid gas through the solution until the soda is converted into bicarbonate, when it will be deposited and can be separated by decantation or filtering, the carbonate of potash with a small quantity of soda salt remaining in solution.

The sulphureted hydrogen may be used for the production of sulphurous or sulphuric acid by well-known means; or the sulphur may be recovered by burning one-half of the gas and mixing the resulting sulphurous acid with the remaining sulphureted hydrogen, which will result in the deposition of the sulphur.

What I claim is—

1. The process described of treating kainit, consisting in mixing the substance with silica or silica and alumina, heating the mixture, passing air or steam through or over it, whereby chlorine or hydrochloric acid is evolved, reducing the sulphates in the residue to sulphides, and treating the sulphides with carbonic acid to form carbonates of soda and potash, substantially as set forth.

2. The process described of treating kainit, said process consisting in mixing the substance with silica or silica and alumina, then heating the mixture and passing steam or air through or over it, then mixing carbonaceous material with the residue, heating this to convert the sulphates into sulphides, lixiviating the sulphides, and finally treating this solution with carbonic acid to form carbonates, all substantially as set forth.

In testimony whereof I have signed my name to this specification in the presence of two subscribing witnesses.

JOSEPH TOWNSEND.

Witnesses:
D. FERGUSON,
JAMES MITCHILL CHADWICK.